Dec. 11, 1928.
G. E. SPAIN
METHOD OF AND APPARATUS FOR TRANSPORTING LOGS
Filed May 4, 1927
1,694,931
2 Sheets-Sheet 1
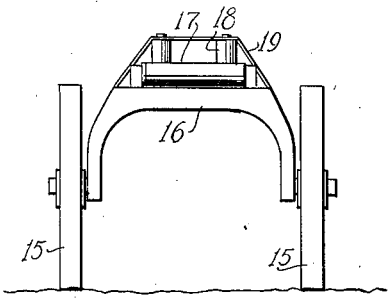
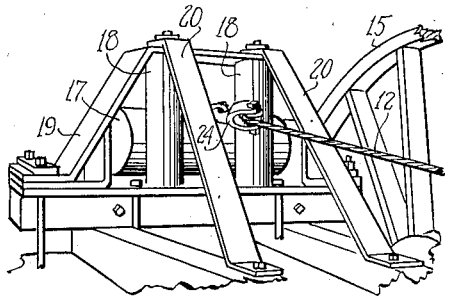
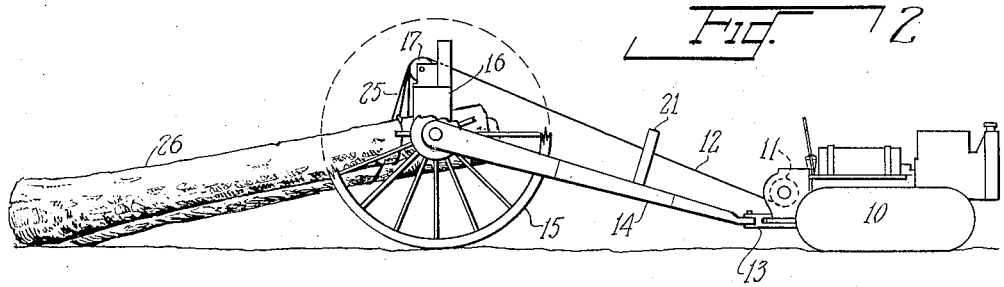
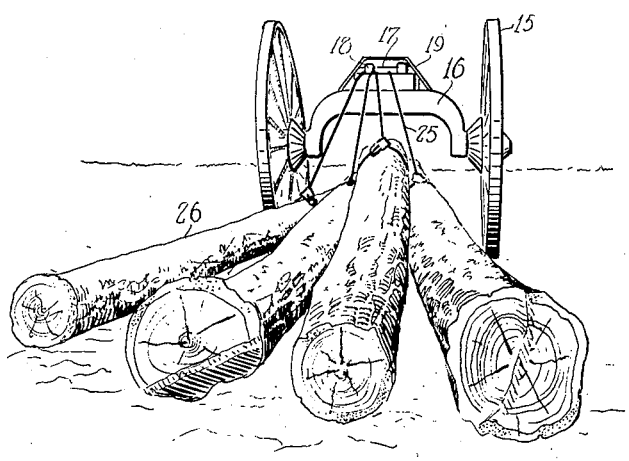
INVENTOR
G. E. Spain
BY C. B. Birkenbeuel.
ATTORNEY

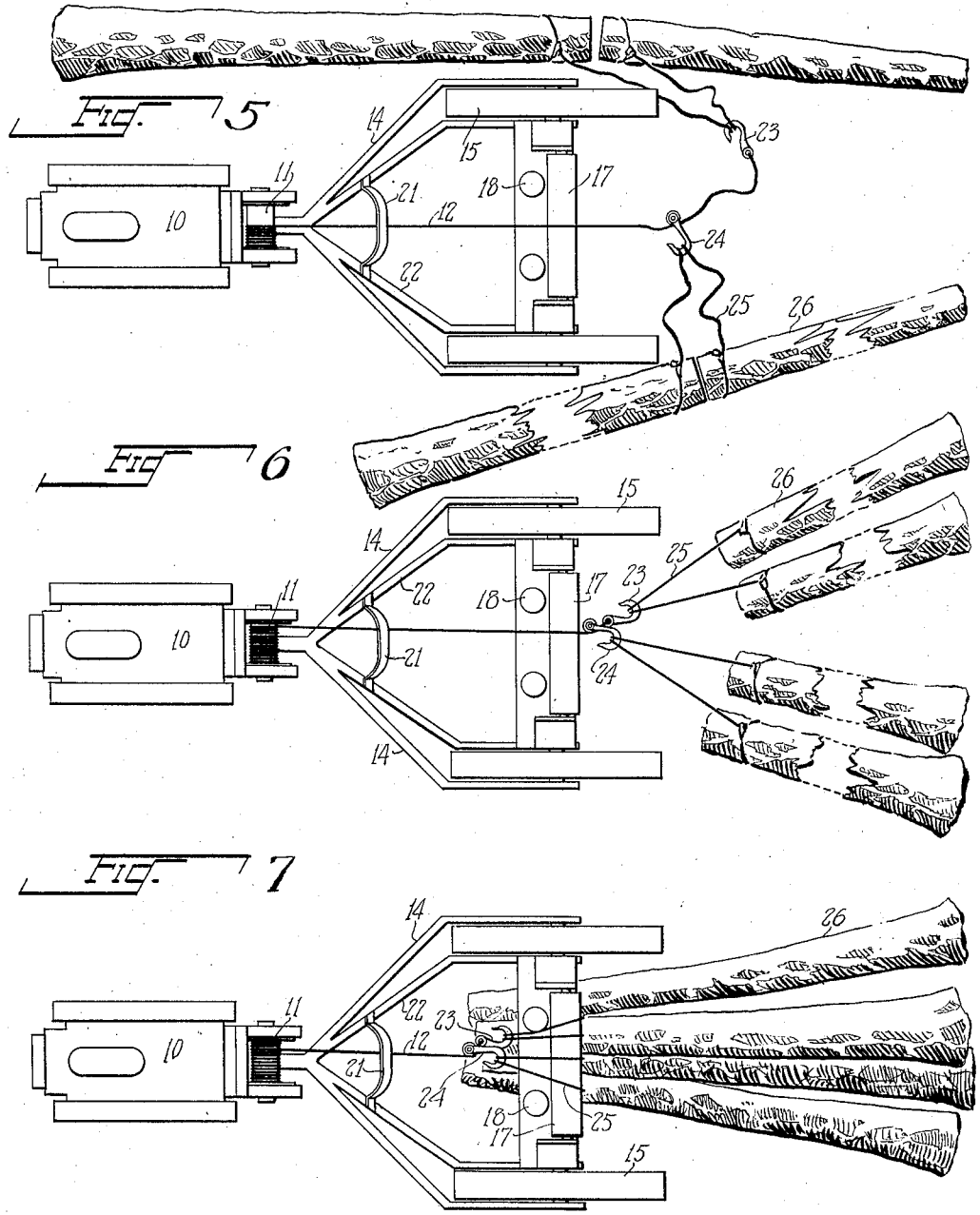

Patented Dec. 11, 1928.

1,694,931

UNITED STATES PATENT OFFICE.

GAIL E. SPAIN, OF PORTLAND, OREGON, ASSIGNOR TO WILLAMETTE IRON AND STEEL WORKS, OF PORTLAND, OREGON.

METHOD OF AND APPARATUS FOR TRANSPORTING LOGS.

Application filed May 4, 1927. Serial No. 188,792.

This invention relates generally to the logging industry, and particularly to a method of and apparatus for gathering or bunching logs and transporting same over relatively smooth or rolling ground.

The main object of this invention is to reduce the cost of logging, and this reduction is largely accomplished by the almost total elimination of the bunching operation as ordinarily practiced.

The second object is to employ a tractor having mounted thereon a cable winding drum whose function it is to bunch the logs and then pick up the forward end of a load clear of the ground and then hold same in a partially suspended position while they are moved by the tractor.

The third object is the total elimination of bunching crews, together with the necessity for housing and feeding men and horses, as well as providing water for such purposes, which is often a serious item in logging operations.

These, and other objects, will become more apparent from the specification following as illustrated in the accompanying drawings, in which:

Figure 1 is a rear elevation of a high wheel vehicle of which Figure 2 is a side elevation showing same attached to a drum carrying tractor and partially supporting a load of logs. Figure 3 is a perspective view of the fair-lead mechanism from the forward side of the vehicle. Figure 4 is a perspective view of the vehicle showing the manner in which the logs are dragged along the ground. Figure 5 is a somewhat diagrammatic plan showing the first step in the operation of transporting logs from the position in which they fall from the stump and have been bucked or cut into suitable lengths for handling. Figure 6 is a view similar to Figure 5 showing the second step, namely the moving of the logs to an approximate parallel position behind the high wheel vehicle. Figure 7 is a similar view showing the forward ends of the logs picked up and ready to be dragged along the ground to the point of delivery.

Similar numbers of reference refer to similar parts throughout the several views.

Before entering into the description of this method and apparatus it must be understood that the common method of skidding pine logs is with the aid of horses, tractors and high wheel vehicles. The first operation performed after the logs have been felled and sawed into suitable lengths is that of bunching or gathering them into piles of from two to five logs, depending upon the size of the logs, contour of the ground, tractor power available and other factors. This operation is generally performed with horses. It is now necessary to haul the logs to the nearest railroad track or other point of delivery.

When the high wheel system is used this is accomplished by straddling the bunches of logs and raising the forward ends thereof up to the axle of the high wheels by means of hydraulic jacks, or other mechanism, so that they are wholly or partially suspended. They are then moved to the point of destination by tractors, or other source of power.

The average cost for bunching logs is approximately $1.05 per M board feet, and it costs an additional twenty cents per M to haul them from the bunch to the point of delivery. This latter amount is, of course, determined by distance, ground and other conditions and varies much more than the bunching cost.

With the system about to be described the bunching operation is eliminated, or rather incorporated as an auxiliary step in the skidding or transporting operation.

Referring in detail to the drawings, there is shown a track laying type of tractor 10 on whose rear end is mounted a cable winding drum 11 on which is spooled a cable 12. Attached to the draw bar 13 of the tractor is a bridle 14 of a high wheel vehicle 15 on whose arch 16 is mounted the fair-leading rolls 17 and 18. The vertical rolls 18 are on the side toward the tractor. This is important, since having them on the rearward side causes the hooks and lines to foul between the rolls 17 and 18.

In the illustration a frame 19 and braces 20 support the ends of the roll 17 and the upper ends of the rolls 18. It is also preferable to provide a guard 21 across the inner portions 22 of the bridle 14.

The cable 12 is provided on its extreme end with a hook 23 and carries along its length one or more roller hooks 24 such as are in common use. To each of the hooks 23 and 24 are attached one or more chokers 25 which are made fast to the individual logs 26 at their most convenient end, although it is customary to drag the logs with their small end foremost.

The operation of the device is as follows: The high wheel vehicle 15 is moved into position (for example as shown in Fig. 5) by means of the tractor 10 and the cable 12 is run out far enough so that all of the chokers 25 can be made fast to their respective log ends.

It is evident that if the drum 11 were now operated some of the logs would be pulled sidewise against the wheels of the vehicle 13 while others would not be moved at all, therefore the next step is to move the high wheel vehicle far enough forward so that the hauling in of the cable 12 will move the logs to the position shown in Figure 6, and a continued hauling in of the cable will raise the forward ends of the logs 26 to the position shown in Figure 7. The brake is now set on the drum to hold the logs in suspension and the load is carried away by the tractor.

Actual tests have shown that where this device superseded the old system of bunching and subsequent skidding that there resulted a saving of from fifty to seventy-five cents per M feet in skidding cost, which is a very considerable item in present-day logging.

While there has been illustrated an ordinary form of fair-lead it can be seen that the details of this portion of the mechanism can be varied very greatly without departing from the spirit of this invention.

I claim:

A log transporting vehicle consisting of a pair of high wheels; a high arched frame joining said wheels; a fair-lead on said high arched frame consisting of a rearward horizontal roller and a pair of spaced vertical rollers in front of said horizontal roller; a bridle for hingedly connecting said vehicle to a tractor and for rigidly supporting said frame, said bridle having a guard placed over the forward end thereof; and a cable winding drum having a line passing under said guard between said vertical rolls and over said horizontal rolls, said line having a plurality of hooks at the end thereof for the attachment of separate choker members.

GAIL E. SPAIN.